(12) United States Patent
Sano (10) Patent No.: US 8,043,038 B2
(45) Date of Patent: Oct. 25, 2011

(54) ANCHOR

(75) Inventor: Takahiro Sano, Toyohashi (JP)

(73) Assignee: Newfrey LLC, Newark, DE (US)

( * ) Notice: Subject to any disclaimer, the term of this patent is extended or adjusted under 35 U.S.C. 154(b) by 21 days.

(21) Appl. No.: 12/644,842

(22) Filed: Dec. 22, 2009

(65) Prior Publication Data

US 2010/0172714 A1     Jul. 8, 2010

(30) Foreign Application Priority Data

Dec. 22, 2008   (JP) ................................. 2008-325512

(51) Int. Cl.
*F16B 13/06*    (2006.01)
(52) U.S. Cl. ............................ 411/45; 411/508; 24/297
(58) Field of Classification Search .............. 411/41–48, 411/508; 24/297
See application file for complete search history.

(56) References Cited

U.S. PATENT DOCUMENTS

| | | | | |
|---|---|---|---|---|
| 4,035,874 A | * | 7/1977 | Liljendahl | 24/114.4 |
| 5,775,860 A | * | 7/1998 | Meyer | 411/46 |
| 6,874,983 B2 | * | 4/2005 | Moerke et al. | 411/46 |
| 6,910,840 B2 | * | 6/2005 | Anscher | 411/41 |
| 6,932,552 B2 | * | 8/2005 | Anscher et al. | 411/41 |
| 7,273,227 B2 | | 9/2007 | Kawai et al. | |
| 7,841,817 B2 | * | 11/2010 | Kawai | 411/45 |
| 2007/0003390 A1 | * | 1/2007 | Kawai | 411/48 |
| 2008/0014045 A1 | | 1/2008 | Kawai | |

FOREIGN PATENT DOCUMENTS

| | | |
|---|---|---|
| EP | 1857333 A2 | 11/2007 |
| EP | 1878925 A2 | 1/2008 |
| JP | 2005-047325 A2 | 2/2005 |
| JP | 2006-161890 A2 | 6/2006 |
| JP | 2006-336821 A2 | 12/2006 |
| JP | 2008-020006 A2 | 1/2008 |

OTHER PUBLICATIONS

European Search Report dated Mar. 29, 2010.

\* cited by examiner

*Primary Examiner* — Gary Estremsky
(74) *Attorney, Agent, or Firm* — Michael P. Leary (57) ABSTRACT

A pin having a head and a plurality of legs extending from that head, and a bushing having a flange and a shank extending from that flange, are comprised. In the flange, holes for accepting a plurality of legs are provided in a plurality corresponding to the number of legs, and in the shank, corresponding spaces for accepting each of the legs which have passed through the holes are provided in a plurality corresponding to the number of legs. The cross-section of the shank is polygonal, spaces are disposed on the surfaces of the shank capable of forming that polygon, and elastic latching pieces extending outward in lateral directions are provided at positions adjacent to the flange in a plurality corresponding to the spaces. By inserting the legs into the spaces, the elastic latching pieces are prevented from being displaced in directions whereby they would approach the spaces.

12 Claims, 8 Drawing Sheets

PRIOR ART

US 8,043,038 B2
ANCHOR

CROSS-REFERENCE TO RELATED APPLICATIONS

This application claims the benefit of Japanese Application No. 2008-325512 filed Dec. 22, 2008, the disclosure of which is incorporated herein by reference.

TECHNICAL FIELD

The present invention concerns an anchor, that is, an anchor whereby fastening can be achieved with a comparatively small force.

BACKGROUND ART

Examples of the configurations and uses of conventional anchors shall now be described with reference to FIGS. 8 to 12. These drawings correspond to the drawings disclosed in TOKKAI [Unexamined Patent Application] No. 2008-20006 (Gazette).

Figure 8:
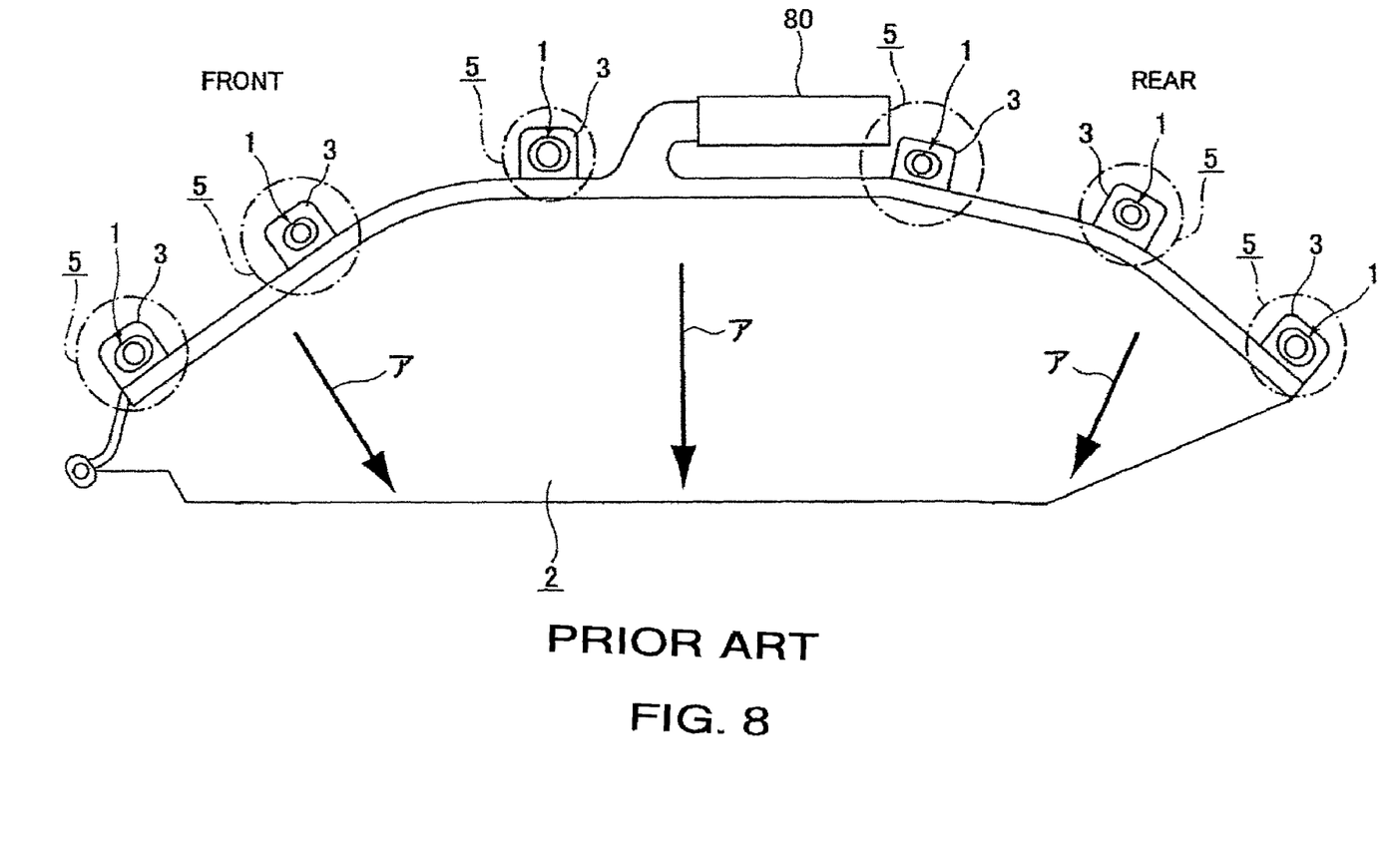
FIG. 8 is a diagram for describing a configuration example and working example of a conventional anchor.

FIG. 8 is a diagram of an example of an attaching member and a member being attached to that can be connected by anchors 1. A curtain shield air bag 2 as an example of an attaching member and an automobile body panel 5 as an example of a member being attached to are represented, respectively. The curtain shield air bag 2 has a main air bag body and attachment parts 3 for supporting the main air bag body. By using the anchor 1 to secure the attachment parts 3 at a plurality of positions above the door window from the front toward the rear inside an automobile, the main air bag body can be installed in a prescribed position on the body panel 5 of the automobile. The main air bag body is usually deployed in a folded-up condition above the door window, whereupon, in the event of a automobile collision or the like, the bag is deployed very rapidly by a gas expelled from a compressed gas source 80 in the direction of the arrows "A" in the figure, for example, and is capable of protecting the side of the head, or the like, of a passenger. FIG. 8 in particular represents the condition of the main air bag body after it has been deployed.

Figure 9:
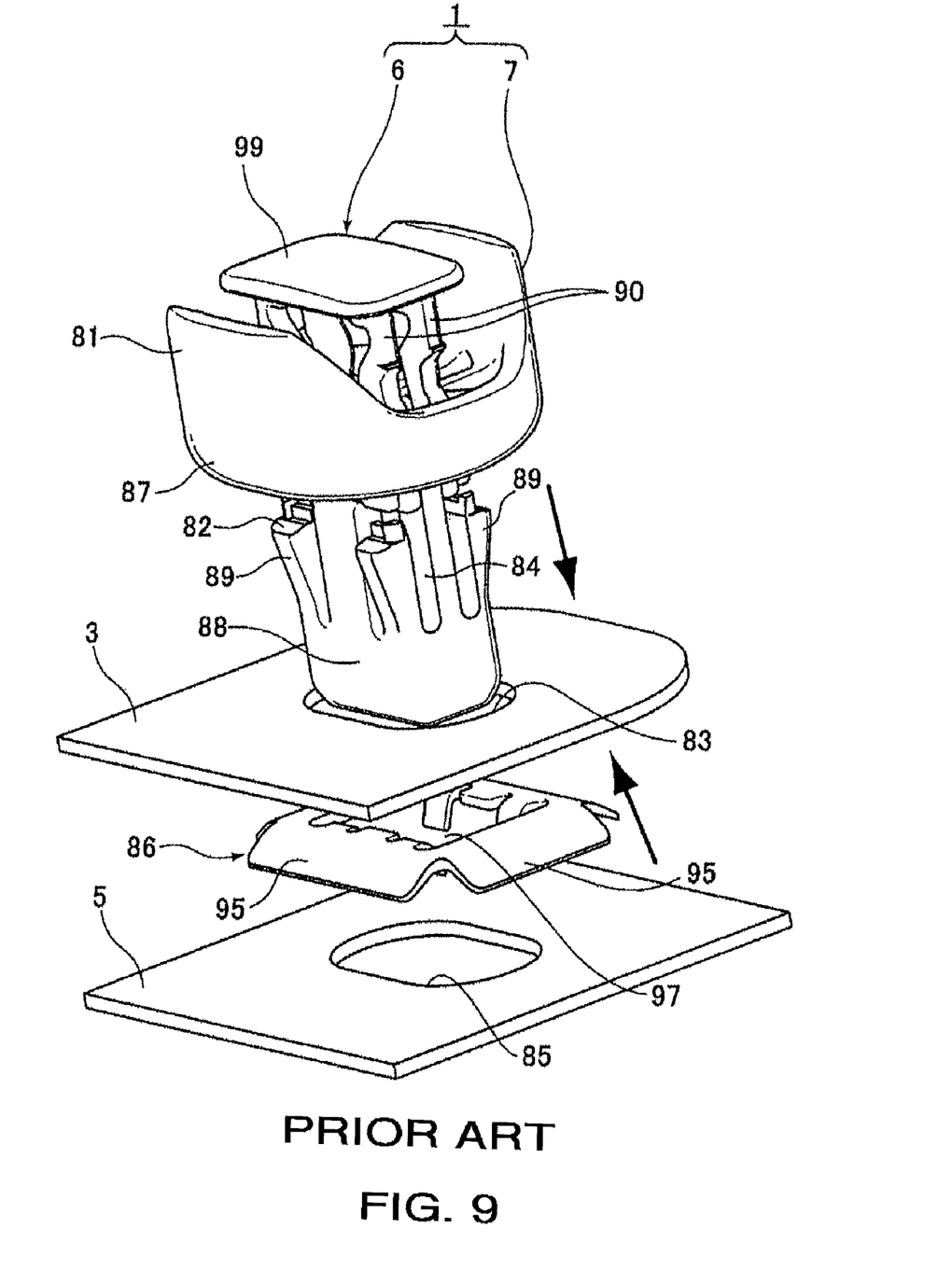
FIG. 9 is a diagonal view representing the provisionally connected condition of a conventional anchor.

FIG. 9 is an enlarged diagram of the situation just before the anchor 1 diagrammed in FIG. 8 is provisionally latched to the body panel 5. The anchor 1 comprises two components, namely a pin (male member) 6 and a bushing (female member) 7. For provisional latching, with these components in the provisionally connected condition, the shank 88 of the bushing 7 is inserted, first into an attachment hole 83 in the attachment part 3 and then into an attachment hole 85 in the body panel 5. During insertion, elastic latching pieces 89 flex inward in lateral directions in a space 84 provided in the shank 88 and then, after passing through the attachment hole 83, are restored to the condition whereby they are extended outward in lateral directions. As a consequence, latching shoulders 82 of the elastic latching pieces 89 engage the back surface of the attachment part 3, the attachment part 3 is clamped between a flange 87 and the elastic latching pieces 89, and provisional attachment is effected to the attachment part 3. Furthermore, although this is discretionary, a spacer 86 having an elastic action may be provided between the attachment part 3 and the body panel 5. The shank 88 portion is passed through an attachment hole 97 in the spacer 86 in like manner as through the attachment hole 83 in the attachment part 3 in the spacer 86 are provided elastic latching pieces 95 that can elastically deform between the attachment part 3 and the body panel 5, whereby "wobble" between the attachment part 3 and the body panel 5 can be eliminated and the attachment stabilized. By selecting the thickness of the spacer 86, the thickness between the attachment part 3 and the body panel 5 can be suitably adjusted.

Figure 10:
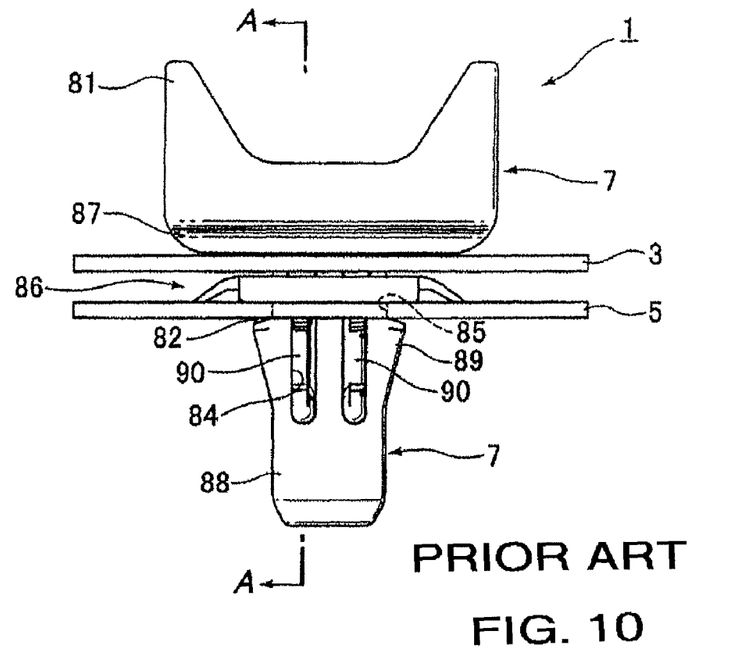
FIG. 10 is a front elevation representing the fully latched condition of a conventional anchor.
Figure 11:
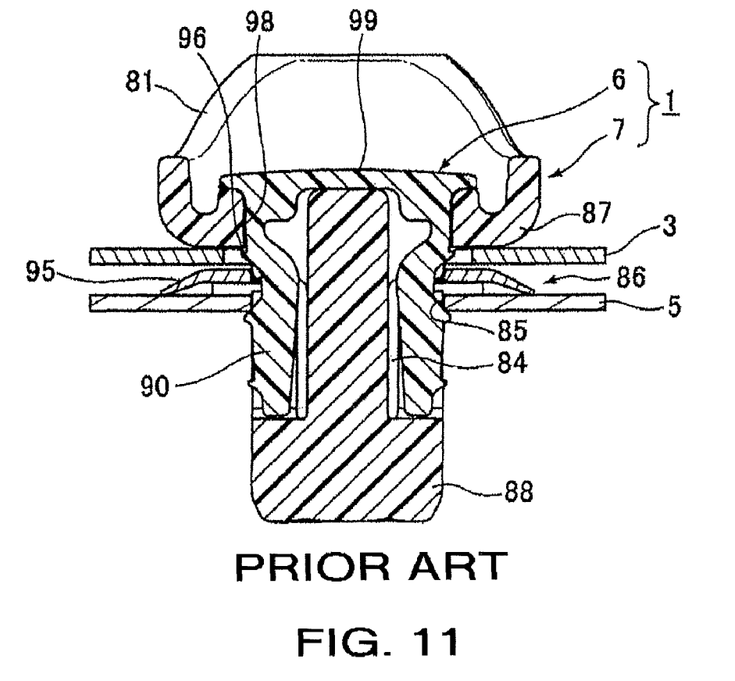
FIG. 11 is a section at line A-A in FIG. 10.

In FIGS. 10 and 11, the fully latched condition of the anchor 1 is diagrammed. FIG. 10 is a front elevation of the fully latched anchor, while FIG. 11 is a section thereof at line A-A in FIG. 10. By placing a finger on a head 99 provided between a pair of upright walls 81 and pressing the pin 6 into the bushing 7, for example, the provisionally latched anchor 1 can easily be fully latched. In the fully latched condition, the shank 88 of the bushing 7 passes through the attachment hole 85 of the body panel 5, and four elastic latching pieces 89 provided at the outer corners of the shank 88, respectively, extend out toward opposite-angle directions on the back side of the body panel 5 and hook firmly on the four inner corners of the hole. The head 99 of the pin 6, furthermore, is adjacent to the flange 8 of the bushing 7, (a) latching projection(s) 96 is/are latched in (a) latching edge(s) 98 of a hole in the flange 87, the legs 90 of the pin 6 are adequately inserted into the space 84 in the bushing 7 and impact against the elastic latching pieces 89 corresponding thereto inside the space 84, and the elastic latching pieces 89 are prevented from flexing to the inside of the shank 88. In this fully latched condition, the latching shoulder 82 portions of the elastic latching pieces 89 are definitely prevented from flexing inside the space 84, whereupon the anchor 1 can connect the attachment part 3 to the body panel 5 (member being attached to) with high securing strength.

In TOKKAI 2005-047325 (Gazette) also, another conventional example, an anchor similar to the one described above is disclosed, except that here, only two elastic latching pieces 65 and 66 are used, and furthermore, in the shank, only two elastic latching pieces which elastically protrude outwardly at positions adjacent to the flange and when the shank has been inserted into the attachment holes of the curtain shield air bag that is the attaching member and of the body panel, these two elastic latching pieces are shaped such that the two members are clamped between the flange and the elastic latching pieces. When the legs have been satisfactorily inserted into the space, however, the elastic latching pieces are prevented from toppling over inward in lateral directions, whereupon the clamping of the two members by the flange and the elastic latching pieces is maintained and so forth, which points are the same as in the conventional example cited earlier.

Patent Literature 1: TOKKAI No. 2008-20006 (Gazette)
Patent Literature 2: TOKKAI No. 2005-047325 (Gazette)

The anchor disclosed in TOKKAI No. 2008-20006 (Gazette) and the like is superior insofar as greater strength (high holding force) can be realized, but because the structure thereof is such that the four elastic latching pieces 89 which extended outwardly at opposing angles are hooked firmly at the four inner corners of the hole, when inserted into the attachment hole 85 of the body panel 5, a comparatively large force is required. Conversely, with the conventional configuration disclosed in TOKKAI No. 2005-047325 (Gazette), because only two elastic latching pieces are used while no large force is required, adequate strength is not obtained, which is a problem.

An object of the present invention, which was devised for the purpose of solving the problems in the prior art, is to provide an anchor that can be attached with a comparatively small force in fastenings requiring high strength (high holding force).

SUMMARY OF THE INVENTION

According to one aspect of the present invention, there is an anchor comprising a male member having a head and a plurality of legs extending from that head and a female member having a flange and a shank extending from that flange; in which a plurality of holes for accepting the plurality of legs and corresponding to the legs is provided in the flange; a plurality of spaces for accepting the legs which have passed through the holes in the shank, corresponding to the legs, is provided; the cross-section of the shank is made in the shape of a polygon, and the spaces are disposed on the surfaces of the shank which surfaces can form the sides of that polygon; and a plurality of elastic latching pieces corresponding to the spaces is provided in the surfaces of the shank, which extended outward in lateral directions at positions adjacent to the flange; whereupon, by inserting the legs into the spaces, the elastic latching pieces are prevented from being displaced in directions whereby they would approach the spaces, and the clamping of the member being attached to by the flange and the elastic latching pieces is maintained.

In the anchor described above, the spaces and the elastic latching pieces may be disposed in the vicinity of the centers of the surfaces of the shank.

In the anchor described above, moreover, latching shoulders may be provided in the elastic latching pieces, and the shank may be inserted in an attachment hole in the member being attached to while the elastic latching pieces are elastically displaced in directions whereby they approach the spaces; by elastically restoring the elastic latching pieces in directions whereby they withdraw away from the spaces, the member being attached to will then be clamped between the latching shoulders of the elastic latching pieces and the flange.

In the above-described anchor, the legs, respectively, may extend linearly along the insertion direction toward the spaces, and the spaces, respectively, may extend laterally along the insertion direction of the legs toward the spaces.

In the anchor described above, moreover, by forming recesses in the cross-section of the shank, the spaces may be formed between an axial column of the shank and the elastic latching pieces.

In the anchor described above, moreover, the legs may have been sufficiently inserted into the spaces, the legs will be disposed in the recesses with substantially no gaps overall.

In the anchor described above, furthermore, the cross-section of the shank may be a rectangle; and that the legs, the elastic latching pieces and the spaces, respectively, be provided in one-to-one correspondence with the side portions forming the rectangle.

In the anchor described above, moreover, that the elastic latching pieces and the spaces may be disposed at equal intervals in the cross-section of the shank.

In the anchor described above, moreover, the condition whereby the legs are satisfactorily inserted into the spaces is attained by the legs being inserted into the spaces until the head is adjacent to the flange.

In the anchor described above, in the legs and the shank, respectively, provisional connection means are provided for obtaining a provisionally connected condition when the legs are inserted part way into the spaces; in which provisionally connected condition, a condition is effected whereby the male member and the female member are connected, but the legs are in positions at which they do not engage, and the elastic latching pieces are allowed to flex in directions whereby they approach the spaces.

In the anchor described above, the provisional connection means provided in the legs may be formed as slanting parts, and the provisional connection means provided in the shank may be formed as latching pawls provided at the edges of the holes in the flange.

In the anchor described above, the head of the male member may be formed in the shape of a rectangular panel corresponding to the cross-section of the shank.

In the anchor described above, moreover, there may also be a pair of upright walls extending out from the flange surface along the direction of insertion of the legs toward the spaces, extending to substantially the same height as the head, in the provisionally connected condition, for preventing the male member from being inadvertently pushed into the female member but disposed so as to be separated by intervals such that the pushing-in of the male member into the female member to effect a fully latched condition is not hindered.

According to aspects of the invention, an anchor is provided that despite exhibiting great fastening strength (high holding force), can nevertheless attach to a member being attached to with comparatively little force.

BRIEF DESCRIPTION OF THE DRAWINGS

FIG. 6 is a pair of sections representing the anchor in a condition wherein it has been provisionally latched to a member being attached to.

EXEMPLARY EMBODIMENTS OF THE INVENTION

An exemplary embodiment of the present invention shall now be described with reference to the attached drawings.

Figure 1:
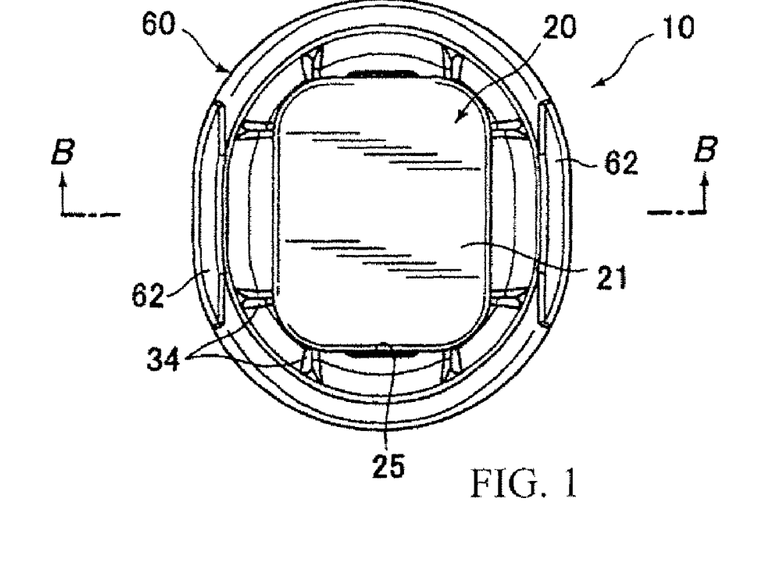
FIG. 1 is a plan of an anchor according to one exemplary embodiment of the present invention.
Figure 2:
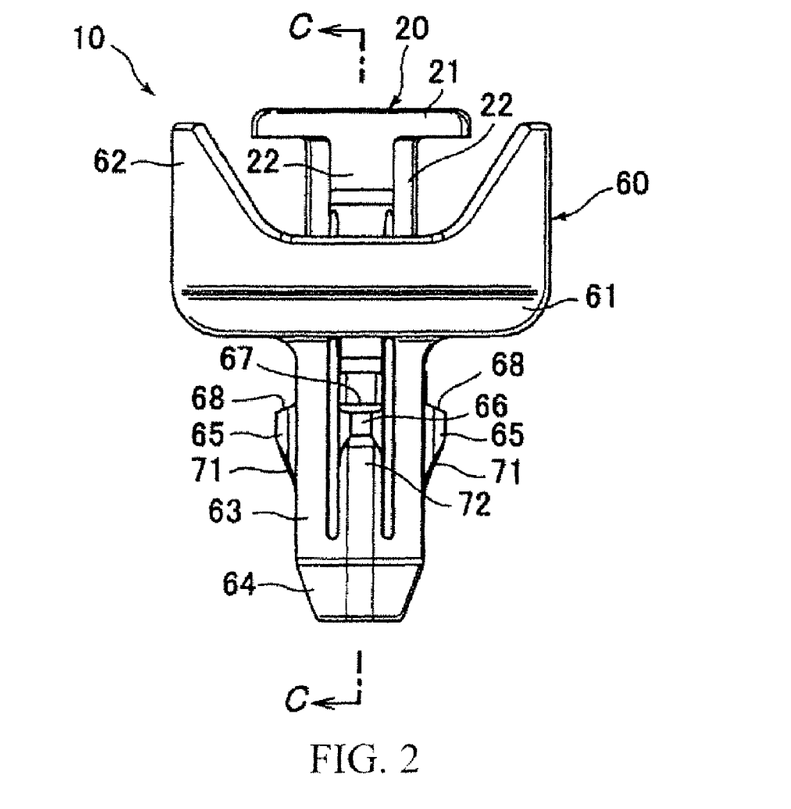
FIG. 2 is a side elevation of the anchor diagrammed in FIG. 1.
Figure 3:
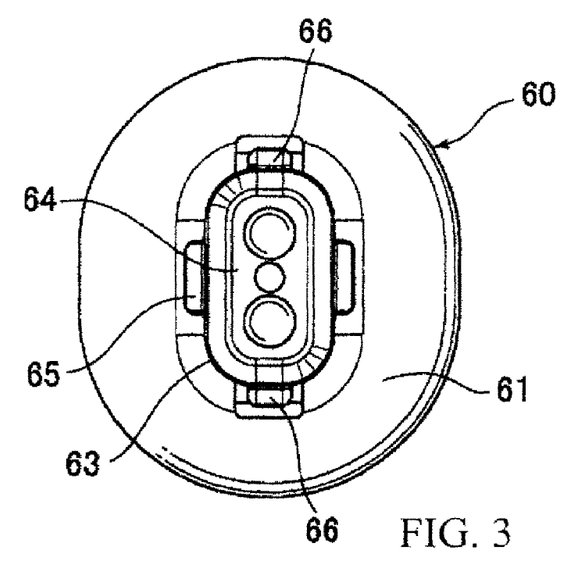
FIG. 3 is a bottom view of the anchor diagrammed in FIG. 1.
Figure 4:
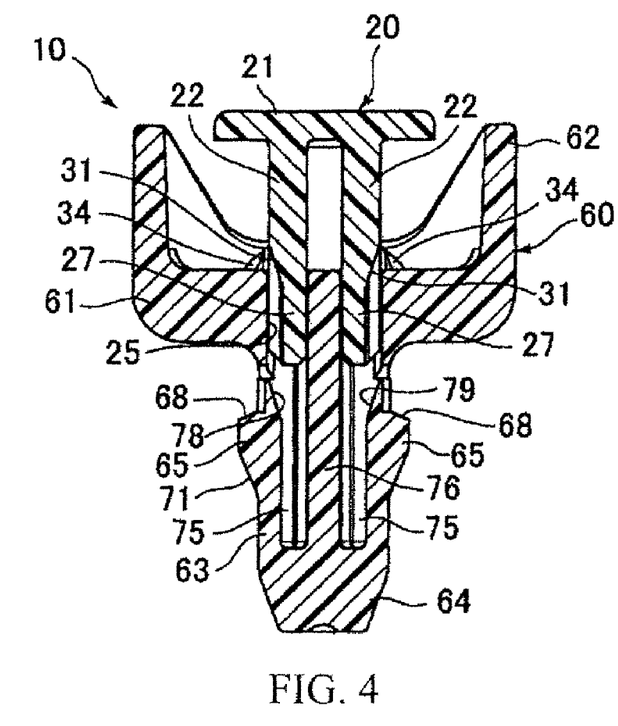
FIG. 4 is a center section at line B-B in FIG. 1.
Figure 5:
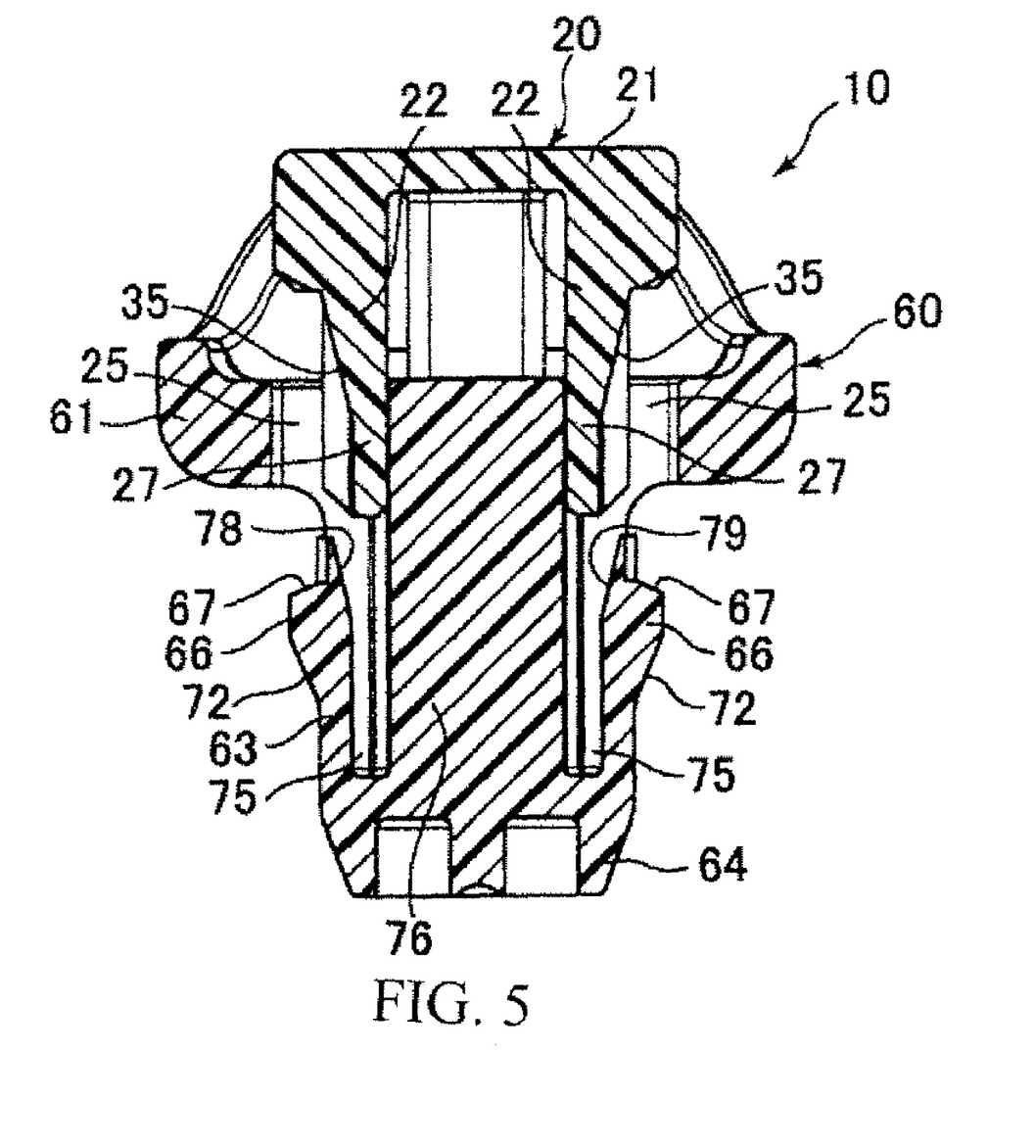
FIG. 5 a center section at line C-C in FIG. 2.
Figure 6:
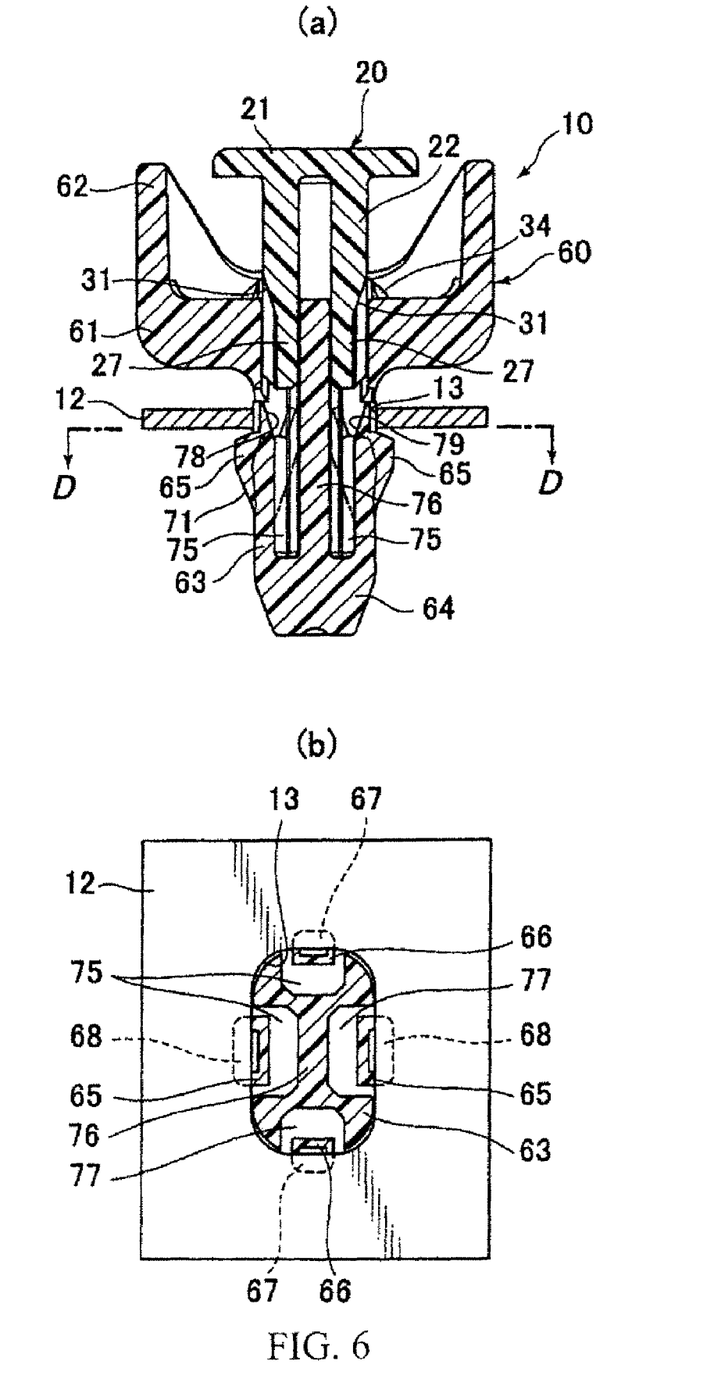
Figure 7:
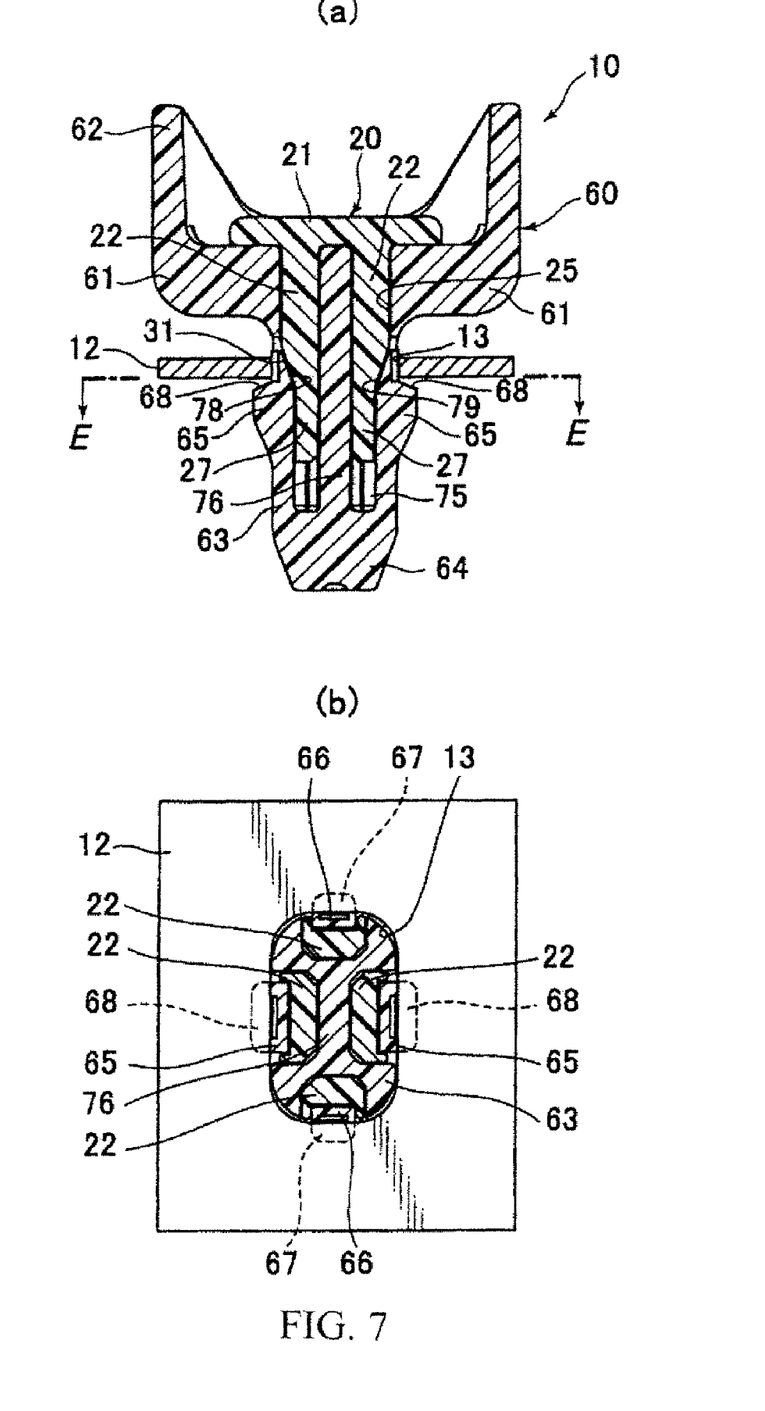
FIG. 7 is a pair of sections of the latched anchor in a condition wherein it has been fully latched.

In FIGS. 1 to 5, one working example of an anchor 10 of the present invention is diagrammed. FIG. 1 is a plan of the anchor 10, FIG. 2 a side elevation thereof, FIG. 3 a bottom view thereof, FIG. 4 a center section at line B-B in FIG. 1, and FIG. 5 a center section at line C-C in FIG. 2, FIG. 6 is a pair of sections representing the anchor 10 diagrammed in FIGS. 1 to 5, in a condition wherein it has been provisionally latched to a member being attached to 12, such as an automobile body panel (indicated by reference number 5 in FIG. 9, etc.). FIG. 7 is a pair of sections of the provisionally latched anchor 10, in a condition wherein it has thereafter been fully latched. The sections in FIG. 6(*a*) and FIG. 7(*a*) correspond, respectively, to the section in FIG. 4, while FIG. 6(*b*) and FIG. 7(*b*) correspond, respectively, to the lateral section at line D-D diagrammed in FIG. 6(*a*) and the lateral section at line E-E diagrammed in FIG. 7(*a*). Furthermore, in all of these drawings, the attaching member (i.e., the attachment part 3 indicated in FIG. 9, and the like) and the spacer (i.e., the spacer 86 indicated in FIG. 9, and the like) diagrammed in the conventional example in FIG. 9 and the like are omitted for convenience, but it may be assumed that these members are provided by the same methods as in the conventional example described with reference to FIG. 9, and the like.

The anchor 10 comprises two components, namely a pin (male member) 20 and a bushing (female member) 60. The pin 20 is formed as an integrally molded molding of a resinous material, such as a plastic. The pin 20 has a head 21 and a plurality of legs 22 (four, in this case) provided perpendicular to that head 21, The head 21 may be formed as a rectangular panel corresponding to the lateral cross-section of the shank 63 of the bushing 60, or the upper surface thereof may be formed in a concave shape to facilitate the operation of pushing the pin 20 into the bushing 60 with a finger.

The legs 22 are formed in correspondence with a plurality of spaces 75 (four, in this case) provided in the bushing 60. These legs 22 are provided so as to be vertical, extending a certain length from the head 21, at positions and with intervals such that they can be inserted into the spaces 75, each, respectively, extending linearly along a direction of insertion toward a space 75. Corresponding thereto, the spaces 75, moreover, extend linearly along the directions of insertion of the legs 22. By effecting such a configuration as this when inserting the legs 22 into the spaces 75, the legs 22 and spaces 75 are not substantially displaced or deformed, and the legs 22 are accommodated nicely into the spaces 75 so as to fill them without requiring a very great force. The lengths of the legs 22, moreover, are made sufficient for preventing elastic latching pieces 65 and 66 of the bushing 60 from being displaced in directions whereby they approach the spaces 75.

Provisional connection means are provided in the middle portions of the legs 22 for effecting a condition wherein the legs 22 are inserted part way into the spaces 75, that is, for placing the pin 20 and bushing 60 in a provisionally connected condition. For the provisional connection means, in the legs 22, slanting parts 31 are employed. These slanting parts 31 may also be used as means for limiting the movement of the elastic latching pieces 65 when the anchor 1 has been put in a fully latched condition.

The bushing 60, in like manner as the pin 20, is formed as an integrally molded molding of a resinous material, such as a plastic. The bushing 60 has a flange 61 and a shank 63 provided so as to be vertical to that flange 61. The flange 61 should be formed as a rigid plate of a certain thickness and suitable area in order to have the function of clamping a member being attached to, or the like. In the flange 61, a plurality of holes 25 is provided, corresponding in number to the legs 22, for accepting the legs 22. In addition is a pair of upright walls 62 which extend upward along the directions of insertion of the legs 22 relative to the spaces 75. The upright walls 62, when the pin 20 and bushing 60 have been placed in the provisionally connected condition, extend to substantially the same height as the head 21 and prevent the pin 20 from being inadvertently pushed into the bushing 60 but are disposed, separated by an interval so as not to constitute a hindrance when pushing the pin 20 into the bushing 60 to effect the fully latched condition.

Corresponding to the slanting parts 31 that are the provisional connection means of the legs 22, at the edges of the holes 25 of the flange 61, a pair of latching pawls 34 is provided, as provisional connection means, at opposing positions, in an upwardly protruding attitude. When the slanting parts 31 of the pin 20 are latched by these latching pawls 34 of the bushing 60, the pin 20 and bushing 60 are rendered into the provisionally connected condition, that is, the condition diagrammed in FIGS. 1 to 5 (and FIG. 6). When in the provisionally connected condition, the pin 20 and bushing 60 are connected, but the legs 22 are in positions where they do not engage the elastic latching pieces 65 and 66, but rather in a condition that allows the elastic latching pieces 65 and 66 to flex in directions whereby they approach the spaces 75, or in other words, in a condition wherein they can flex inside the spaces 75 acting as an axial hole.

In the shank 63, the spaces 75 are provided in a plurality (four, in this case) corresponding to the number of legs 22 in order to accept the legs 22 that have passed through the holes 25 provided in the flange 61. In addition, corresponding to the spaces 75, the elastic latching pieces 65 and 66 are provided, four in number, extending outward in lateral directions at positions adjacent to the flange 61. The spaces 75 are formed, for example, between an axial column 76, on the one hand, and the elastic latching pieces 65 and 66, on the other, by forming recesses 77 in the lateral cross-section of the shank 63. The axial column 76, furthermore, is a rigid portion that is provided so as to be vertical in the vicinity of the center of the flange 61, extending in the axial direction. The elastic latching pieces 65 and 66, on the other hand, each extend independently from the tip of the axial column 76 toward the flange 61, and the tip ends thereof extend from the lower end of the axial column 76 to the flange 61 side, elastically protruding out to the outside in lateral directions.

The lateral cross-sections of the axial column 76 and shank 63 are made polygonal (rectangular in this case, for example) in correspondence with the fact that the attachment hole 13 of the member being attached to 12 is made a square hole (not shown in the drawings). The spaces 75 and elastic latching pieces 65 and 66 are disposed at equal intervals in a cross shape, as seen in a lateral sectional perspective, in one-to-one correspondence with the side portions (not the outer corner portions) of this rectangular lateral cross-section, that is, on the surfaces of the shank 63 and preferably near the centers thereof. By effecting such a disposition as this, as compared, for example, to the conventional structure wherein four elastic latching pieces extending outwardly at opposing angles are hooked firmly on the four inner corners of a hole, attachment with a smaller force is made possible. The tip end 64 of the shank 63, moreover, is formed in a closed (not opened) shape to enhance strength, in view of the fact that it is the portion that first impacts the member being attached to, or the like, when the anchor 10 is inserted into an attachment hole, or the like, of the member being attached to.

Last of all, the action of the anchor 10 is described with reference to FIGS. 6 and 7. The anchor 10 can be used as means for connecting an attaching member (the attachment part 3 diagrammed in FIG. 9, or the like) or spacer (the spacer 86 diagrammed in FIG. 9, or the like) to the member being attached to 12. Furthermore, the shapes of the attachment hole 13, attaching member hole or spacer hole, while not clear from the drawings, may be assumed to be rectangular, corresponding to the lateral cross-sectional shape of the shank 63 as in the conventional example diagrammed in FIG. 9, or the like.

First, as diagrammed in FIG. 6, the anchor 10 wherein the pin 20 and bushing 60 are provisionally connected (the condition diagrammed in FIGS. 1 to 5) is provisionally latched in the member being attached to by the shank 63 of the bushing 60 being inserted first into the attachment hole 13 of the member being attached to (body panel 12) and the attaching member hole (corresponding to the attachment hole 83 of the attachment part 3 diagrammed in FIG. 9, or the like) and then into the spacer hole (corresponding to the attachment hole 97 of the spacer 86 indicated in FIG. 9, or the like). During insertion into the attachment hole 13 and the like, the elastic latching pieces 65 and 66, through contact between the slanting parts 71 and 72 thereof and the attachment hole 13, or the like, are elastically displaced in directions whereby they approach the spaces 75 as indicated by the dotted broken lines in FIG. 6. Subsequent thereto, after completely passing through the attachment hole 13, these elastic latching pieces 65 and 66 elastically return in directions whereby they become more distant from the spaces 75. As a consequence, the member being attached to 12 and members peripheral thereto are clamped between the latching shoulders 67 and 68 of the elastic latching pieces 65 and 66, on the one hand, and the flange 61, on the other, and the anchor 10 is provisionally latched to the member being attached to 12. As described above, the elastic latching pieces 65 and 66 of the bushing 60, by being disposed on the surfaces wherein the spaces 75 are provided and preferably near the centers thereof, the elastic latching pieces 65 and 66 when being inserted will be able to come up against the straight parts of the square attachment hole 13 of the member being attached to 12, that is, against the sides of the rectangular attachment hole 13 and the like, near their centers. Consequently, as compared for example to the conventional structure wherein four elastic latching pieces extending outwardly at opposing angles are hooked firmly on the four inner corners of a hole, it is possible to effect insertion with low loading. As a result, based on this anchor 10, it becomes possible to effect insertion, even in fastenings where great strength (high holding force) is required, with comparatively little force as, for example, by one touch of a finger.

After provisional latching, by pressing the pin 20 into the bushing 60, the fully latched condition is achieved, as diagrammed in FIG. 7. In the fully latched condition, the provisionally connected condition between the pin 20 and the bushing 60 is released, the head 21 of the pin 20 adjoins the flange 61 and the legs 22 are sufficiently inserted into the spaces 75. When the pin 20 has been pushed sufficiently into the bushing 60, due to the presence of the legs 22, the elastic latching pieces 65 and 66 of the bushing 60 are prevented from being displaced in directions whereby they would approach the spaces 75 and, by the flange 61 and the latching shoulders 67 and 68 provided in the elastic latching pieces 65 and 66, the member being attached to 12 and the attaching member (indicated by reference number 3 in FIG. 9, and the like) or a spacer (indicated by reference number 86 in FIG. 9, and the like) are firmly clamped therebetween. In this fully latched condition, furthermore, the slanting parts 31 and 35 of the pin 20 come tightly up against backside slanting parts 78 and 79 provided in the vicinity of the latching shoulders 67 and 68 on the elastic latching pieces 65 and 66, whereupon the elastic latching pieces 65 and 66 are strongly prevented from flexing. At such time, furthermore, the legs 22 are disposed in the recesses 77 with substantially no gaps overall, and after fastening, the lateral cross-section in the vicinity of the axial column 76 will be disposed in a shape with no gaps as compared to conventional clips of the same type, as diagrammed in FIG. 7(b). By the configuration described in the foregoing, an anchor is provided that can be attached to a member being attached to with comparatively little force, even though a high-strength (high holding force) fastening force is exhibited.

It will be appreciated by persons skilled in the art that the above embodiments have been described by way of example only, and not in any (imitative sense, and that various alterations and modifications are possible without departure from the scope of the invention as defined by the appended claims.

What is claimed is:

1. An anchor comprising:
a male member having a head and a plurality of legs extending from that head, and a female member having a flange and a shank extending from that flange, wherein:
a plurality of holes is provided in said flange for accepting said plurality of legs and corresponding to said legs;
a plurality of spaces is provided in said shank for accepting said legs which have passed through said holes and corresponding to said legs;
the cross-section of said shank is made in the shape of a polygon, and said spaces are disposed on the surfaces of said shank which surfaces form the sides of that polygon; and,
a plurality of elastic latching pieces corresponding to said spaces is provided in the surfaces of said shank, which extend outward in lateral directions at positions spaced from said flange, said spaces and said latching pieces both being disposed in the vicinity of the centers of the surfaces of said shank;
whereby when said legs are located in said spaces said elastic latching pieces are prevented from being displaced in directions whereby they would approach said spaces.

2. The anchor according to claim 1, wherein latching shoulders are provided in said elastic latching pieces; said shank is located in an attachment hole in a member being attached to, said elastic latching pieces are adapted to be elastically displaced in directions whereby they approach said spaces; and to be elastically restored in directions whereby they withdraw away from said spaces, whereby said member being attached to is then clamped between the latching shoulders of said elastic latching pieces and said flange.

3. The anchor according to claim 2 wherein said legs, respectively, extend linearly along the insertion direction toward said spaces, and said spaces, respectively, extend laterally along the insertion direction of said legs toward said spaces.

4. The anchor according to claim 3, wherein by providing recesses in the cross-section of said shank, said spaces are formed between an axial column of said shank and said elastic latching pieces.

5. The anchor according to claim 4, wherein when said legs are located within said spaces, said legs are disposed in said recesses with substantially no gaps.

6. The anchor according to claim 5, wherein the cross-section of said shank is a rectangle; and said legs, said elastic latching pieces and said spaces, respectively, are provided in one-to-one correspondence with the side portions forming said rectangle.

7. The anchor according to claim 6, wherein said elastic latching pieces and said spaces are disposed at equal intervals in the cross-section of said shank.

8. The anchor according to claim 7, wherein said legs are satisfactorily inserted into said spaces is when said head is adjacent to said flange.

9. The anchor according to claim 8, wherein in said legs and said shank, respectively, provisional connection means are provided for obtaining a provisionally connected condition when said legs are inserted part way into said spaces; in which provisionally connected state, a condition is effected whereby said male member and said female member are connected, but said legs are in positions at which they do not engage said elastic latching pieces, and said elastic latching pieces are able to flex in directions in which they approach said spaces.

10. The anchor according to claim 9, wherein the provisional connection means provided in said legs are formed as slanting parts, and the provisional connection means provided in said shank are formed as latching pawls provided at the edges of the holes in said flange.

11. The anchor according to claim 10, wherein said head of said male member is formed in the shape of a rectangular panel corresponding to the cross-section of said shank.

12. The anchor according to claim 11, also having a pair of upright walls extending out from said flange surface along the direction of insertion of said legs toward said spaces, extending to substantially the same height as said head in said provisionally connected condition, for preventing said male member from being inadvertently pushed into said female member but disposed so as to be separated by intervals such that the pushing-in of said male member into said female member to effect a fully latched condition is not hindered.

* * * * *